(12) United States Patent
Meyermann

(10) Patent No.: US 7,507,333 B2
(45) Date of Patent: Mar. 24, 2009

(54) METHOD OF AND APPARATUS FOR CLEANING RUNOFF WATER

(75) Inventor: Austin Meyermann, Mt. Airy, MD (US)

(73) Assignee: Thomas E. Pank, Walkersville, MD (US)

(*) Notice: Subject to any disclaimer, the term of this patent is extended or adjusted under 35 U.S.C. 154(b) by 259 days.

(21) Appl. No.: 10/966,923

(22) Filed: Oct. 15, 2004

(65) Prior Publication Data

US 2005/0087502 A1 Apr. 28, 2005

Related U.S. Application Data

(60) Provisional application No. 60/514,176, filed on Oct. 25, 2003.

(51) Int. Cl.
*B01D 21/26* (2006.01)
(52) U.S. Cl. .......... 210/170.03; 210/304; 210/305; 210/512.1; 210/532.1
(58) Field of Classification Search .......... 210/170.03, 210/512.1, 304, 305, 532.1
See application file for complete search history.

(56) References Cited

U.S. PATENT DOCUMENTS

| | | | | | |
|---|---|---|---|---|---|
| 2,076,935 | A | * | 4/1937 | Burckhalter | 210/132 |
| 3,487,931 | A | * | 1/1970 | Paulson | 210/130 |
| 4,885,090 | A | * | 12/1989 | Chupka et al. | 210/497.01 |
| 4,933,094 | A | | 6/1990 | Kalnins | |
| 4,995,989 | A | | 2/1991 | Carroll | |
| 5,037,558 | A | | 8/1991 | Kalnins | |
| 5,147,556 | A | * | 9/1992 | Taylor | 210/712 |
| 5,407,584 | A | * | 4/1995 | Broussard, Sr. | 210/703 |
| 5,522,999 | A | | 6/1996 | Broussard | |
| 5,531,888 | A | | 7/1996 | Geiger | |
| 5,565,101 | A | | 10/1996 | Kuntz | |
| 5,746,911 | A | * | 5/1998 | Pank | 210/170.03 |
| 5,779,888 | A | | 7/1998 | Bennett | |
| 5,788,848 | A | | 8/1998 | Blanche | |
| 5,814,216 | A | | 9/1998 | Filion | |
| 6,241,881 | B1 | | 6/2001 | Pezzaniti | |
| 6,264,835 | B1 | * | 7/2001 | Pank | 210/170.03 |
| 6,730,222 | B1 | * | 5/2004 | Andoh et al. | 210/304 |
| 7,077,957 | B2 | * | 7/2006 | Posselt | 210/304 |

OTHER PUBLICATIONS

NJCAT Technology Verification CDS Technologies Inc. Jun. 2003.

* cited by examiner

*Primary Examiner*—Terry K Cecil
(74) *Attorney, Agent, or Firm*—William D. Hall

(57) ABSTRACT

Runoff water from parking lots and filling stations is cleaned by first passing via an inlet pipe tangentially into a vortex chamber where the swirling action separates the contaminants from the water. Floating contaminants are stored in the vortex chamber, trapped at the top of the chamber by the roof of that chamber and at the lower part of the chamber by a skirt. That roof has an access opening to permit removal of the floating contaminants. The body of the fluid thereafter moves downward into a settling chamber where heavier-than-water contaminants settle. As the fluid in the settling chamber builds up, it passes through cleaning screens to a clean water outlet. A by-pass overflow pipe to process very large volumes of water extends upward from the settling chamber. Each screen may have louvers for preventing contaminants from blocking the screen.

2 Claims, 3 Drawing Sheets

METHOD OF AND APPARATUS FOR CLEANING RUNOFF WATER

RELATED APPLICATION

This application claims the benefit of my copending Provisional application Ser. No. 60/514,176, filed Oct. 25, 2003.

BACKGROUND OF THE INVENTION

The invention was developed for use in stormwater drainage systems, and combined sewer systems (some older US cities have combined sanitary and stormwater sewers). These sewers are designed and constructed to convey water from a developed area into natural receiving water or other destination. When storm sewers were first constructed, the goal was to remove the water from the developed area and convey it into the receiving water as quickly as possible. At that time, no attention was paid to the potential for pollution from stormwater runoff.

During the last twenty years, stormwater runoff has been identified as a significant source of pollution in waters of the United States. The stormwater runoff from a developed area (a parking lot, for example) can contain oils and other fluids from leaking cars, zinc and heavy metals from brake pads and other sources, nutrients from fertilizers and air pollution, sediments, and garbage and other debris. All of these constituents impact the receiving water that the stormwater drainage system discharges to.

In addition to these pollutants, many older US cities have combined sewer systems, in which the sanitary sewer drainage and stormwater runoff are conveyed in the same pipes. These systems function perfectly well when the weather is dry, but have the potential to overflow during large storms. Because wastewater treatment plants are designed to handle limited flows, even frequently recurring storms have the potential to exceed the treatment capacity of the plant. These cases are termed combined-sewer overflows (CSOs).

With the reauthorization of the Clean Water Act, Congress gave EPA the authority to regulate discharges to waters of the United States from larger stormwater drainage systems, including CSOs. Over the last four years, the scope of the regulation has been increased to include many medium sized and small stormwater drainage systems as well. In response to increasing regulation and federal oversight, a demand exists for devices which are capable of removing stormwater-specific pollutants from a flow stream.

Other technologies, including BaySaver's patented physical separator (U.S. Pat. Nos. 5,746,911 and 6,264,835), rely on gravity settling and sedimentation to remove suspended sediments, oils, and other floatable debris from stormwater runoff. These systems, while effective at low flow rates, often include a bypass structure that allows high flows to pass through or around the system untreated. Although the runoff during intense storms usually has lower concentration of pollutants like sediments, nutrients, and oils, there is often a significant amount of trash, debris, and other floatable material entrained in the water. The present invention is intended to remove these constituents from stormwater or CSO runoff and retain them in a structure so that they can be easily removed during routine maintenance.

The prior art used for this purpose includes several US-patented systems. These systems often rely on vortex technology and hydraulic flow controls to enhance the removal of contaminants from the influent water, and many of the existing systems include. multiple outlet streams: a single outlet for treated effluent, and a second outlet for contaminated flow.

SUMMARY OF THE INVENTION

A vortex chamber is used to swirl runoff water to separate the contaminants from the water. Such a vortex chamber has a conventional input for feeding the runoff water under sufficient head to produce the swirl.

A settling tank is at a lower level than the vortex chamber and receives the water and the heavier-than-water contaminants.

The vortex chamber is new in that it has a skirt portion extending downwardly from the inlet pipe. This skirt portion will. have water in it continuously and will, therefore, receive and hold the lighter-than-water contaminants until they are removed by a regular cleaning.

The skirt portion has a funnel in it which causes the water from the swirl to speed up and then expand when it leaves the funnel and passes into the settling chamber. The aforesaid increase in speed followed by an expansion further tends to separate the contaminants from the water.

A shelf in the settling chamber acts as means for preventing the swirling water from resuspending any accumulated material in the settling chamber.

The head of water in the skirt forces the water in the settling chamber to rise along the outer sidewall of the skirt. There it passes through permeable barriers (which may be screens) to a clean water outlet.

The permeable barriers which clean the water have a series of louvers projecting from the permeable barriers at acute angles to the direction of flow. This enable the louvers to prevent contaminants from blocking the permeable barrier.

DETAILED DESCRIPTION OF THE INVENTION

Figure 1:
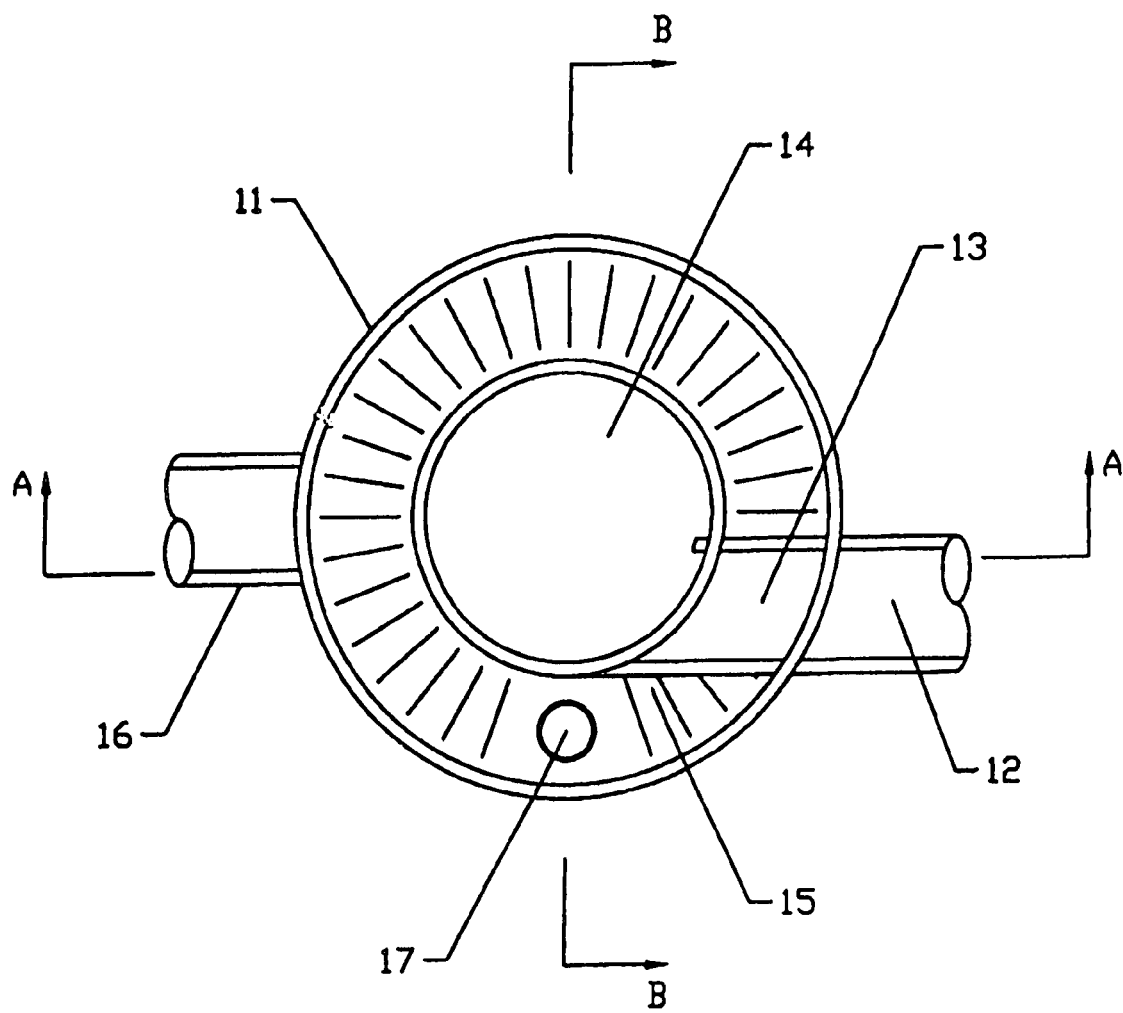
FIG. 1 is a plan view of the preferred form of the invention.
Figure 2:
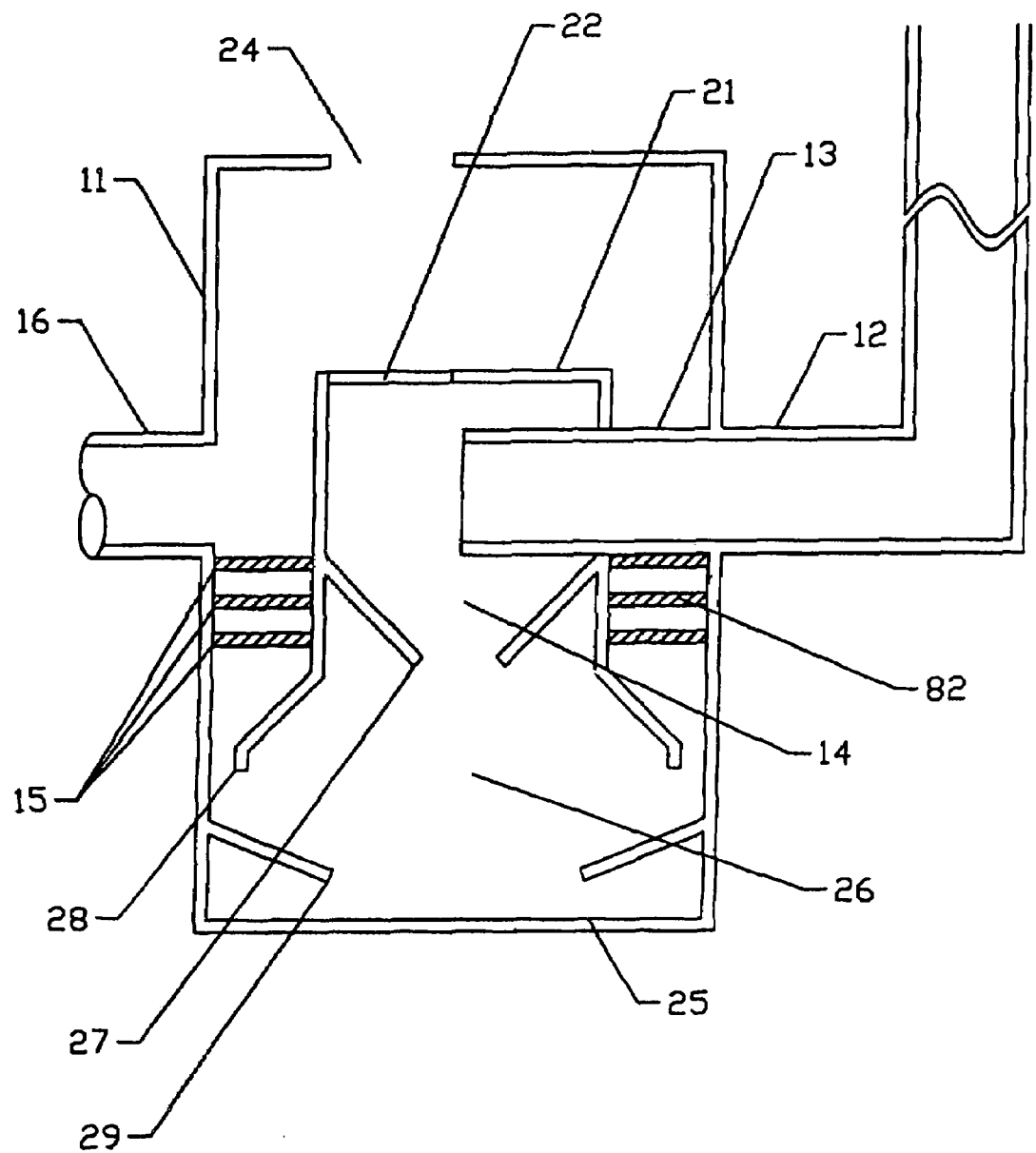
FIG. 2 is a cross sectional view of the preferred form of the invention taken along line A-A as shown in FIG. 1.
Figure 3:
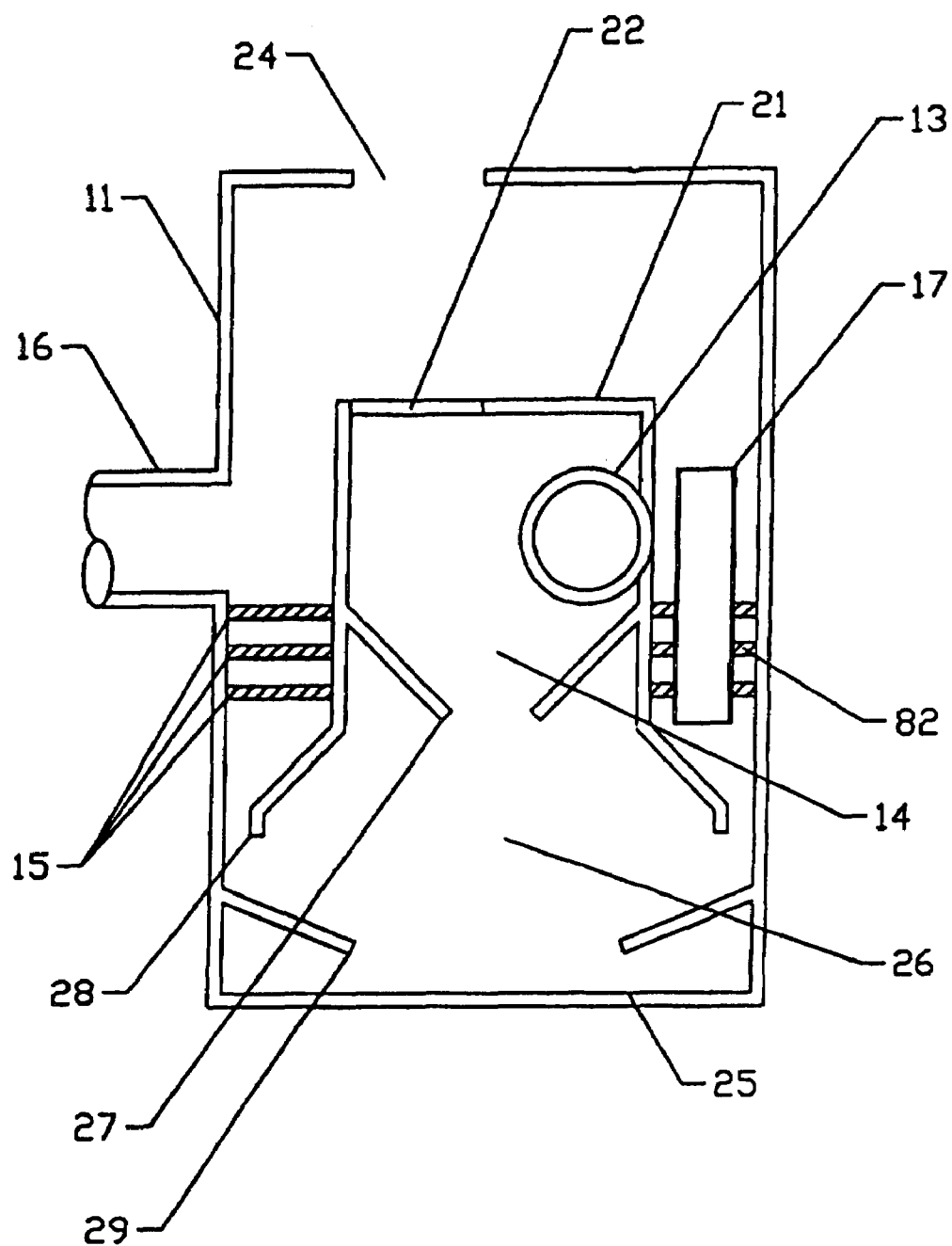
FIG. 3 is a cross sectional view of the preferred form of the invention taken along line B-B as shown in FIG. 1.

FIGS. 1, 2, and 3 show the preferred form the invention. FIG. 1 is a plan view of the invention. FIG. 2 is a cross sectional view taken along line A-A as indicated in FIG. 1 and FIG. 3 is a cross sectional view taken along line B-B as indicated in FIG. 1.

The invention is housed in a container, comprising a floor 25, a top 21 with an opening 22 for access, and side walls 11. A fluid carrying contaminants to be separated is introduced to the system through inlet 12, which penetrates side wall 11 and conveys the fluid to pipe 13. Inlet means 12 conveys a fluid that has sufficient upstream head to force the fluid through the system, as indicated by the vertical section of inlet means 12 in FIG. 2. From pipe 13, the fluid enters vortex chamber 14, tangentially, as commonly done, where the swirling action helps to separate the contaminants from the fluid. Floating contaminants are stored in the vortex chamber 14, trapped by the roof 21 of the vortex chamber. In the roof 21 of the vortex chamber is a sealed opening 22 that can be removed to provide access to the accumulated contaminants within the chamber.

The cylindrical sidewall, of vortex chamber 14, extends considerably below the lowest part of inlet pipe 12, to form a skirt portion which in turn forms a storage chamber for lighter-than-water contaminants. When oil or other low density contaminants are separated from the water by the swirling action, such low-density contaminants remain on the surface of the water that has moved downward from the space where the swirl occurred. These light-weight contaminants remain on the surface of the water in tank 11, until the system is given its periodic cleaning at which time such contaminants are removed from the lower part of the vortex chamber 14 through opening 22 in the top of that chamber.

The fluid exits vortex chamber 14 by flowing downward through the inclined walls 27. The inclined walls 27 maintain the swirling flow path while increasing the velocity of the fluid through this part of the invention. When the fluid passes through the narrowest part of inclined walls 27 and enters settling chamber 26, the fluid loses a significant amount of energy because of the sudden expansion. This energy loss helps to settle contaminants that are denser than the fluid to the floor 25 of the structure. Once the material is settled on floor 25 of the structure, a shelf 29 prevents the swirling currents from resuspending the accumulated material, and the material is retained in the structure until it is removed.

Once the fluid flows from the confines of chamber 14 down through inclined walls 27 and into settling chamber 26, it is driven outward around skirt 28 and up through permeable barrier or barriers 15. Each of the one or more permeable barrier(s) is a plate or similar structure containing a plurality of openings intended to allow the fluid to pass through the permeable barrier (screen) while trapping contaminants within the confines of the settling chamber 26. The openings in permeable barrier (15) can be sized to trap particular contaminants, and can be designed in such a way as to not impede the flow. This is accomplished through the use of louvers angled against the direction of flow, as shown in FIG. 9 of U.S. Pat. No. 4.885,090. Additionally, more than one permeable barrier 15 may allow for enhanced pollutant removal by the present invention. Permeable barrier(s) 15 are placed within the unit in a horizontal fashion, parallel with the unit floor and allowing fluid to flow vertically through the barrier. In instances where multiple barriers are used, the size of the openings may or may not vary with the different barriers. This variability allows the present invention to be designed for specific instances in which particular contaminants are expected and desired to be removed.

Once the fluid flow has passed through permeable barrier (s) 15, it enters outlet means 16, which conveys the treated effluent to its destination. The lowest point of outlet means 16 is at the same elevation or lower than the lowest point of inlet means 12. Because of this relationship, the present invention functions under gravity flow, and requires no additional sources of energy to operate. This relationship also prevents the present invention from causing a backup in inlet means 12. Said backup could potentially cause problems with upstream structures, and is a generally undesirable feature of such systems.

During periods of high influent flow rates, an additional flow path through the present invention is possible. In this case, the influent fluid enters the present invention through inlet means 12, is conveyed into vortex chamber 14 by conveyance means 13, and enters settling chamber 26 from vortex chamber 14 as it does under normal flow conditions. If the plurality of openings in permeable barrier(s) 15 does not allow the full flow of the fluid to pass through to the outlet means 16, the fluid will be forced through the overflow 17.

The fluid enters overflow means 17 from a point below the bottom of the lowest permeable barrier(s) 15, and is forced upward through overflow means 17 by hydrostatic pressure. When the influent flow rate to the present invention is great enough, this hydrostatic pressure will force the fluid upwards through the open top of overflow 17, allowing the excess water to enter outlet means 16 without passing through permeable barrier(s) 15. This flow path is utilized during periods when the flow rate is high enough that the influent fluid cannot pass through the plurality of openings in permeable barrier(s) 15, or if the plurality of openings in permeable barrier(s) 15 are blocked by some item that prevents normal operation.

Openings 24 in the top of the unit itself and 22 in the top of the vortex chamber allow access to the trapped contaminants. This access can be used for environmental monitoring, process monitoring, or maintenance purposes. In addition to the floatable storage within the vortex chamber, these openings also allow access to the settling chamber to remove any pollutants that have settled to the floor of the device.

I claim:

1. A system for cleaning runoff water that may vary from a low to a high flow rate, comprising:
    a vortex chamber having an inner wall and an outer wall,
    an inlet for receiving said runoff water and directing that water into said vortex chamber to produce a swirling action by the water,
    an inclined wall, at least a portion of which is at a level below the elevation of said inlet, which extends downwardly and inwardly from said inner wall for increasing the velocity of the water passing through the inclined wall,
    a settling chamber for receiving the water after it swirls,
    an outlet fed by water from said settling chamber,
    at least one permeable barrier in the path of the water passing from said settling chamber to said outlet, said permeable barrier defining a hole therethrough,
    a by-pass conduit for diverting part of the water around said permeable barrier when the incoming flow rate is large, said by-pass conduit passing through said hole,
    said outlet being at the same level as said vortex chamber,
    a container having an inner wall surrounding said vortex chamber with a substantial space between said outer wall of said vortex chamber and said inner wall of said container, so that water passing through said vortex chamber may pass to said settling chamber and then upward through said space between said vortex chamber and said container to said outlet, said vortex chamber having a skirt at its downstream end, said skirt extending downwardly and outwardly into said space so that said permeable barrier is above at least a part of said skirt in said space,
    said at least one permeable barrier located between said chamber outer wall and said container inner wall for cleaning the water passing from said settling chamber to said outlet.

2. A system for cleaning runoff water that may vary from a low to a high flow rate as defined in claim 1, wherein said permeable barrier is a screen.

* * * * *